M. W. HANKS.
ELECTRICAL COOKING OR HEATING APPARATUS.
APPLICATION FILED NOV. 30, 1914.

1,175,442.

Patented Mar. 14, 1916.
2 SHEETS—SHEET 1.

WITNESSES:
Fred H. Miller
B. B. Hines

INVENTOR
Marshall W. Hanks
BY
ATTORNEY

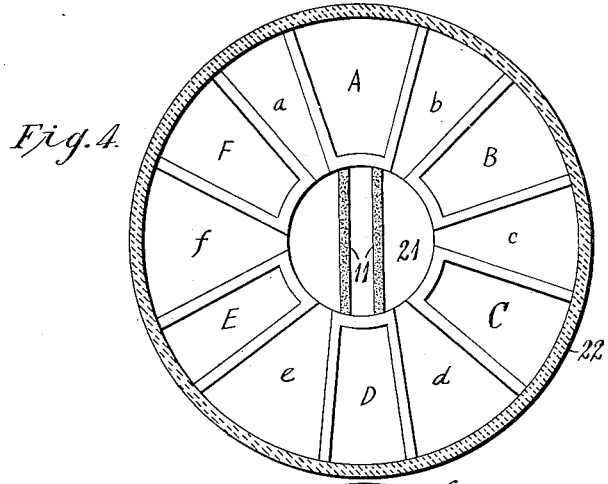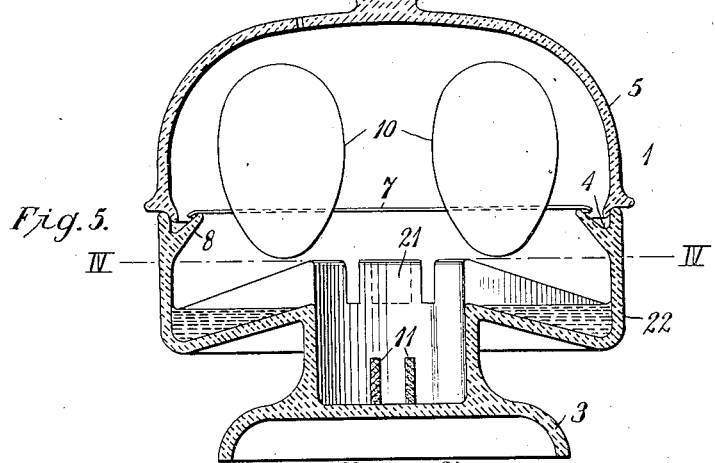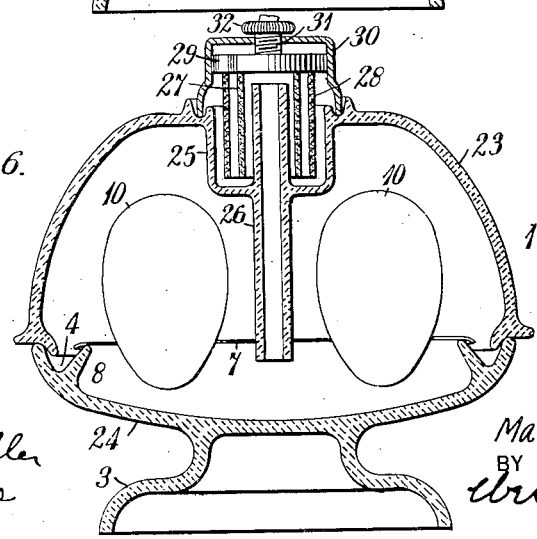

UNITED STATES PATENT OFFICE.

MARSHALL W. HANKS, OF INDIANAPOLIS, INDIANA.

ELECTRICAL COOKING OR HEATING APPARATUS.

1,175,442.  Specification of Letters Patent.  Patented Mar. 14, 1916.

Application filed November 30, 1914. Serial No. 874,670.

*To all whom it may concern:*

Be it known that I, MARSHALL W. HANKS, a citizen of the United States, and a resident of Indianapolis, in the county of Marion and State of Indiana, have invented a new and useful Improvement in Electrical Cooking or Heating Apparatus, of which the following is a specification.

My invention relates to electrical cooking or heating apparatus, and it has for its object to provide apparatus of this character that shall perform the cooking or heating operation in any one of a plurality of time periods of predetermined and definite duration.

My invention is illustrated in the accompanying drawings in which—

Figure 1:
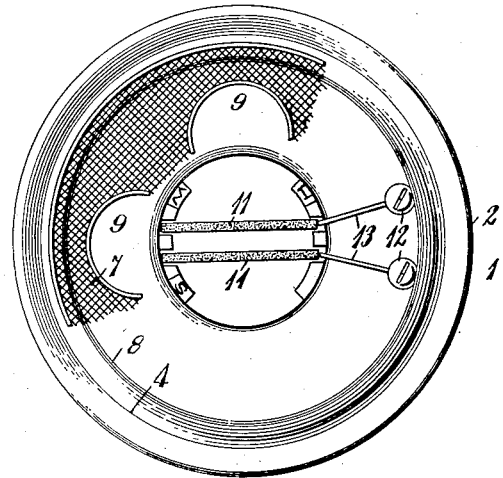
Figure 2:
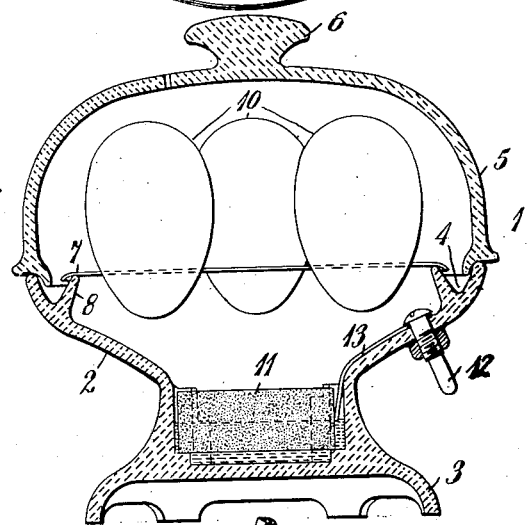
Figure 3:
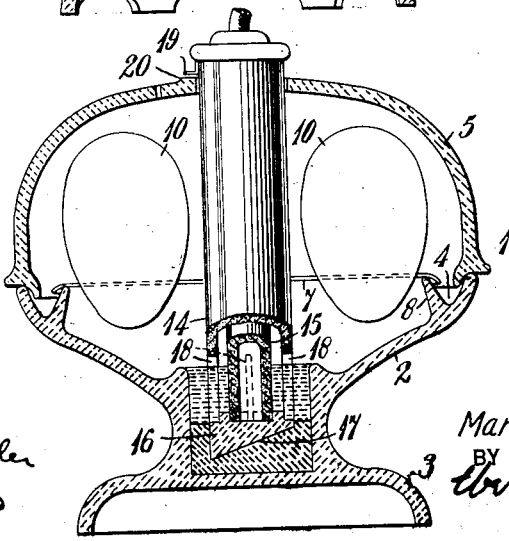

Figure 1 is a plan view of the body portion of one form of cooking or heating vessel embodying my invention, the supporting member for the articles to be cooked or heated being partially broken away. Fig. 2 is a vertical sectional view of the entire cooking or heating vessel the body portion of which is shown in Fig. 1. Fig. 3 is a view, partially in vertical section and partially in elevation, of a modified form of cooking or heating vessel. Fig. 4 is a horizontal sectional view, taken on line IV—IV of Fig. 5. Fig. 5 is a vertical sectional view of another modified form of cooking or heating vessel, and Fig. 6 is a vertical sectional view of still another modified form of cooking or heating vessel.

My invention is primarily intended for use in cooking eggs and is illustrated as utilized for this purpose, but it may be employed for cooking any articles of food or for evaporating any vaporizable liquid under predetermined conditions, as regards the time during which the cooking operation or liquid vaporization shall continue.

Referring to Figs. 1 and 2, 1 is a heating or cooking vessel comprising a body portion 2 of any convenient size, form and material having a suitable base 3 and a circumferential recess or channel 4, preferably at or near its upper edge, and a removable cover 5 having a suitable knob or handle 6. The articles to be cooked or heated may be supported upon a plate 7 that rests upon the flange 8 which is provided on the body portion 2 to form the recess or channel 4. As shown, the plate 7 is formed of perforated or reticulated metal and is provided with a plurality of circular openings 9 to receive the ends of eggs 10, but any other desired kind of supporting plate may be employed. In the bottom portion of the body member 2 are located two spaced electrodes 11 of carbon or other noncorrodible conducting material which are connected to suitable terminals 12 by means of wires or strips 13.

When it is desired to use the apparatus for cooking or heating purposes, a sufficient quantity of water is placed in the space in which the electrodes 11 are located, and the terminals 12 are connected to a suitable circuit for supplying the character of electrical energy for which the apparatus is adapted. As the water between the electrodes 11 constitutes a conductor of relatively high resistance, it becomes quickly heated to boiling temperature. The steam thus produced fills the space within the vessel and serves to cook the eggs or other articles that are supported upon the plate 7. As soon as the water between the electrodes is completely vaporized, generation of heat ceases because the electrical circuit is thus interrupted. The steam that condenses on the inside of the cover flows into the recess or channel 4 and is thus prevented from replenishing the supply between the electrodes and thereby rendering the duration of the heating or cooking operation indeterminate. Although the major portion of the generated steam will condense upon the interior surface of the cover and will flow therefrom into the channel 4, some of it will condense upon the articles to be cooked or heated. In order that the degree of cooking or heating may be approximately independent of the number and size of articles, I so locate the articles—as indicated in Fig. 2—that the water of condensation which collects upon their surfaces will drop into the recess in which the electrodes are located and thus replenish the body of liquid to be vaporized proportionately to the number and size of articles to be cooked or heated to a predetermined degree.

In order to insure a plurality of definite time periods, I may provide small platforms or ledges S M and H at different heights above the bottom of the recess in which the electrodes 11 are located to serve as gages for the water. If the apparatus is employed for cooking eggs, evaporation of a body of water the surface of which is at the level of the ledge S will insure "soft" boiling. If water is added to the level of the ledge M the eggs will be "medium" and if added to the level of the ledge H the eggs will be "hard."

Gages of any desired number and spacing may, of course, be employed.

In the apparatus shown in Fig. 3, the parts 2, 3, 4, 5, 7, 8 and 10 are, or may be, substantially like the corresponding parts shown in Figs. 1 and 2. In this form of apparatus, however, the electrodes 14 and 15 are in the form of concentric tubes that project through an opening in the cover 5 and are joined together at their lower ends by a non-conducting block 16 having a beveled bottom face that is seated in a socket 17 having a like coöperating surface. The lower ends of the electrodes are provided with slots 18 to permit ready access of the water, and the upper end of the outer electrode 14 is provided with a pointer 19 to coöperate with a suitably graduated scale 20 on the top of the cover 5. In the use of this apparatus, the recess in the bottom of the vessel may be filled with water and duration of the heating or cooking operation may be predetermined by rotatively turning the electrodes to the desired degree, as indicated by the scale, and the beveled surfaces of the parts 16 and 17 will correspondingly raise the electrodes so that the desired quantity of water will have been evaporated when the circuit is interrupted.

In the apparatus shown in Figs. 4 and 5, the parts 3, 4, 5, 6, 7, 8, 10 and 11 are, or may be, the same as the corresponding parts shown in Figs. 1 and 2 but, in this modification, the body portion of the vessel 22 is provided with a set of measuring chambers a, b, c, d, e and f disposed circumferentially around the electrode recess 21 and in open communication therewith at their inner ends. The measuring chambers have downwardly and outwardly inclined bottoms and are separated from each other by overflow chambers A, B, C, D and E so that each measuring chamber can hold only a definite amount of water. After the measuring chamber corresponding to the cooking or heating interval desired has been filled, the vessel may be tilted sufficiently to permit its contents to flow into the space 21, when the current may be turned on and the cooking or heating operation be proceeded with until complete evaporation of the water interrupts the circuit.

In the apparatus shown in Fig. 6, the parts 3, 4, 8 and 10 are, or may be, the same as the corresponding parts shown in the other figures, but, in this modification, the body portion 24 has no water-holding space or recess. The cover 23, however, is provided with an inwardly projecting water-holding cup 25 having a central tube 26 that projects upwardly into the cup and downwardly into the body portion 24. The electrodes 27 and 28 are in the form of concentric tubes that may be raised and lowered by any suitable screw or cam device as they are given rotative movement in order that they may project to a greater or less degree into the water in the cup 25. As here shown, the electrodes are suspended from a head 29 that is located in a cap 30, with the top of which engages a screw 31 that is fastened to the head 29 and is provided with a thumb piece 32.

While I have shown several forms of apparatus in which my invention may be embodied, it will be understood that I have not attempted to do more than to indicate a few of the many forms that may be utilized to perform the functions that are characteristics of my invention, and I desire that no limitations shall be imposed that are not specified in the appended claims. It will be further understood that the liquid to be vaporized by the means hereinbefore described may be measured before it is introduced into the vessel containing the vaporizing electrodes; in which case, the electrode-adjusting and internal measuring devices may be omitted.

I claim as my invention:

1. An electric cooking or heating apparatus comprising a pair of spaced electrodes and a vessel adapted to contain a vaporizable liquid and provided with means for gaging the amount of liquid to be vaporized in order to definitely limit the duration of the cooking or heating operation.

2. An electric cooking or heating apparatus comprising a pair of spaced electrodes and a vessel within which the electrodes are located for partial submersion in a vaporizable liquid, said device being also provided with means for gaging the amount of liquid to be vaporized in order to definitely limit the duration of the cooking or heating operation.

3. In an electric cooking or heating apparatus, the combination with a vessel having a removable cover and a circumferential recess to receive water of condensation, of a supporting plate for articles to be cooked and a pair of spaced electrodes located contiguous to a part of the vessel that is adapted to receive a body of vaporizable liquid.

4. In an electric cooking or heating apparatus, the combination with a vessel having a removable cover and a circumferential internal channel or recess to receive water of condensation, of a holder for articles to be cooked, and a pair of spaced electrodes located contiguous to the bottom of a portion of the vessel that is adapted to receive a body of vaporizable liquid.

5. An electric cooking or heating apparatus comprising a vessel having a recess for receiving a measured quantity of vaporizable liquid, means for vaporizing the liquid in said recess, means for preventing the return of water of condensation from the inner surface of the vessel to said recess and means for supporting articles to be cooked or heated in positions to permit the return of water of condensation from the surfaces of said articles to said recess whereby the degree of cooking or heating is rendered approximately independent of the number and size of articles to be cooked or heated.

6. An electric cooking or heating apparatus comprising a pair of spaced electrodes and an inclosing vessel adapted to receive a body of liquid to be vaporized by the passage of electrical energy through it from one electrode to the other, said vessel embodying a cooking or heating chamber that is provided with means for insuring a substantially definite cooking or heating period.

7. An electric cooking or heating apparatus comprising a pair of spaced electrodes, and an inclosing vessel adapted to contain a body of vaporizable liquid to close the circuit between the electrodes, said vessel embodying a closed cooking or heating chamber provided with means for supporting articles to be cooked or heated and with means for insuring a cooking or heating period of substantially definite duration.

8. In an electric heating or cooking apparatus, the combination with a vessel adapted to receive a body of vaporizable liquid and having a cover, a support for articles to be cooked and means for collecting water of condensation, of a pair of spaced electrodes projecting into the body of vaporizable liquid, and means for insuring any one of a plurality of cooking or heating periods of definite duration.

9. In a liquid-evaporating apparatus, the combination with a vessel adapted to receive a measured quantity of vaporizable liquid and having a cover and means for collecting water of condensation, of a pair of spaced electrodes projecting a predetermined distance into the liquid to insure a definite measured time period of vaporization.

In testimony whereof, I have hereunto subscribed my name this 24th day of November 1914.

MARSHALL W. HANKS.

Witnesses
F. L. CAVANAGH,
GRACE SISSON.